Patented Aug. 3, 1926.

1,594,491

UNITED STATES PATENT OFFICE.

LOUIS C. BILSTEIN, OF WEST ORANGE, NEW JERSEY, ASSIGNOR TO UNITED STATES RADIUM CORPORATION, A CORPORATION OF NEW YORK.

LUMINOUS COMPOUND.

No Drawing. Application filed November 12, 1921. Serial No. 514,603.

This invention relates to improvements in luminous or phosphorescent compositions, and particularly to compositions of that character which are self-luminous in the dark by reason of the inclusion of radio-active material therein.

The invention is directed to the provision of a luminous or phosphorescent composition activated or stimulated by radio-active material, such as a radium salt, in a form in which there is a homogeneous distribution of the luminous composition in a suitable medium and mixing, stirring or other treatment of the composition immediate prior to its application is rendered unnecessary.

The material which constitutes the present invention is in the form of a paste, jell or heavy liquid which has the luminous or phosphorescent composition thoroughly mixed into it. Such a paste may be easily applied with little or no preliminary manipulation, such as mixing, stirring, etc., and when it sets, it produces an unbroken, firm, non-brittle luminous coating. The paste, jell, or liquid preferably has a specific gravity approximately the same as that of the luminous or phosphorescent composition so that the latter will remain in suspension therein without any tendency to settle.

More specifically, the composition comprises a paste or jell, which is preferably transparent or translucent and has a self-luminous material homogeneously distributed therein and consisting of a radio-active material, such as a salt of radium, and a radio-responsive material such as zinc-sulphide, calcium sulphide or the like. The paste or jell may be a jell of a colloidal substance which has been gelatinized by suitable means or it may be a resin or gum of a suitable nature which, when dissolved, will upon proper treatment become a solid, a semi-solid, or a dense liquid. For some uses, it is desirable to so select the material for the jell that the composition will be irreversible, that is, it will be insoluble in the original solvent.

In practicing the invention, the following procedure may be adopted:

Gelatin is dissolved in water and made to form a jell, either by concentrating or cooling, or adding starch or other suitable thickening agent until the jell has reached the proper consistency. To this partially set jell is added the requisite amount of a luminous or phosphorescent composition, for instance a radio-active material, such as a salt of radium, and a radio-responsive material, such as zinc sulfide or calcium sulfide. After the luminous composition is thoroughly incorporated with the jell, the mixture is allowed to cool, and after setting, it has the characteristics of a homogeneous paste. To render it suitable for application, it may be thinned by heating or by the use of a proper solvent. The colloidal nature of the material tends to maintain the luminescent composition in permanent suspension, thus doing away with the necessity for stirring, etc., immediately preceding its application.

If the luminous material consists of gelatin and a luminescent composition, it may be rendered irreversible by treating it with formaldehyde or a similar chemical compound. This treatment is resorted to after a surface has been coated with the luminous composition. The jell is thus rendered completely insoluble in water, gasoline, or the like, so that the coated article will retain its luminosity even though it be immersed or submerged in water, gasoline, or other solvent.

While the above description refers to a preferred embodiment, it should be understood that suitable variations and modifications may be made without departing from the spirit of the invention.

I claim:

The process of making a luminous material which comprises mixing a partially set gel of an aqueous colloidal solution with a radio active substance and a radio responsive material of substantially the same specific gravity as the gel and allowing the gel to completely set to produce a composition in which the radio active substance and the radio responsive material are homogeneously mixed with the gel and thoroughly disseminated therethrough.

In testimony whereof I affix my signature.

LOUIS C. BILSTEIN.